United States Patent Office 3,829,430
Patented Aug. 13, 1974

---

3,829,430
METHOD FOR THE PREPARATION OF TETRA-HALO-4-(ALKYLSULFONYL)PYRIDINES
Demetrios Kyriacou, Clayton, Calif., assignor to The Dow Chemical Company, Midland, Mich.
No Drawing. Filed Jan. 11, 1973, Ser. No. 322,882
Int. Cl. C07d 31/48
U.S. Cl. 260—294.8 F                    2 Claims

ABSTRACT OF THE DISCLOSURE

Tetrahalo-4-(alkylsulfonyl)pyridines are prepared by a method which comprises dissolving an appropriate tetrahalo-4-(alkylthio)pyridine or tetrahalo-4-(alkylsulfinyl)pyridine in concentrated sulfuric acid followed by the addition thereto of aqueous hydrogen peroxide and reacting the mixture at a temperature between 20° and 110° C. The products of this invention are useful as pesticides for the control of various bacteria and fungal pests.

PRIOR ART

Tetrahalo-4-(alkylsulfonyl)pyridines and their use as pesticides are taught in U.S. Pat. 3,296,272. The preparation of these compounds employing various oxidation agents including hydrogen peroxide and an organic liquid reaction medium such as acetone, glacial acetic acid or a mixture of acetic acid and acetic anhydride is also taught. U.S. Pat. 3,415,832 teaches the preparation of these compounds employing chlorine gas as the oxidation agent. Gilman "Organic Chemistry" Vol. IV, page 1124 (1953), J. Wiley and Sons, Inc. N.Y. teaches use of Caro's acid for the general reaction $R_2S \rightarrow R_2SO \rightarrow R_2SO_2$.

SUMMARY OF THE INVENTION

The present invention is directed to a new and improved method for the preparation of tetrahalo-4-(alkyl sulfonyl)pyridines. These compounds correspond to the following formula

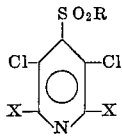

In this and succeeding formulae, R represents alkyl of 1 to 6 carbon atoms and X represents chlorine, bromine or fluorine.

The term "alkyl" as employed in the present specification or claims designates a straight or branched chain alkyl radical of 1 to 6 carbon atoms, such as methyl, ethyl, n-propyl, isopropyl, n-butyl, isobutyl, secondary butyl, tertiary butyl, amyl, isoamyl, 2-ethylbutyl, 1,1-dimethylpropyl, hexyl, secondary hexyl.

The tetrahalo-4-(alkylsulfonyl)pyridines are crystalline solid materials which are of very low solubility in water and of moderate solubility in common organic solvents. They are useful as pesticides for the control of various organisms and particularly for the control of many bacterial and fungal pests such as *Venturia inaequalis*, *Staphylococcus aureus*, *Candida albicans*, *Verticillium alboatrum*, *Piricularia oryzae*, *Phythium spp.*, *Rhozoctonia solani*, *Fusarium solani*, *Salmonella pullorum*, *Trichophyton mentagrophytes*, *Erwinia amylovora*, *Bacillus cereus*, *Cerospora beticola*, *Penicillium digitatum*, *Streptomyces scabies* and *Thielaviopsis basicola*. They have been found to be particularly useful for application to plants and plant parts for fungal control and to mitigate the attack of the organisms of mold and mildew. They have also been found to be of outstanding value as constituents in plaster, ink, wallboard, textiles, wood, paper, adhesives, soaps, detergents, cutting oils, polymeric materials, and oil and latex paints to prevent the attack of various fungal pests and the subsequent economic loss due to the degradation of such products by micro-organisms.

As indicated hereinabove, the tetrahalo-4-(alkylsulfonyl)pyridines can be prepared by known methods of oxidation of the corresponding allylthio pyridine. The oxidation is accomplished in these known methods by employing an oxidizing agent such as chlorine gas in the presence of water, nitric acid, hydrogen peroxide, potassium permanganate or chromate, and chromate-sulfuric acid (mixture of alkali metal chromate and sulfuric acid). The oxidation of one molecule of sulfide to the corresponding sulfone requires two atoms of oxygen. Usually the oxidizing agent is employed in molar proportions which will provide oxygen in stoichiometric amounts. These oxidative procedures have usually been characterized in giving relatively low yields of the sulfonyl pyridines and/or a relatively high content of undesired reaction products such as the intermediate sulfinyl pyridines.

The sulfinyl compounds are not so lacking in biocidal activity as to render ineffective the sulfonyl pyridines when mixed therewith, and tetrahalo-4-(alkylsulfonyl)-pyridine end products comprising as much as 15 mole percent of the corresponding sulfinyl pyridines are valuable in the above enumerated uses. However, it is generally highly preferred that the sulfonyl products be essentially free of the sulfinyl compounds. It has been found quite difficult to separate out the sulfinyl content of the mixed products obtained with known methods of sulfide oxidation. Accordingly, it is evident that an improved method for the manufacture of the tetrahalo-4-(alkylsulfonyl)pyridines is desirable in order to provide for adequate commercial quantities of the products in the market place.

It is an object of the present invention to provide a new and improved method for the production of tetrahalo-4-(alkylsulfonyl)pyridines. It is a further object to provide a method which is more economical than known methods and gives yield of the sulfonylpyridines in excess of those previously obtained. A particularly important object is the provision of a method which gives the desired sulfonylpyridines containing no substantial amounts of sulfinylpyridines. Other objects will become apparent from the following specification and claims.

The present method comprises dissolving an appropriate tetrahalo-4-(alkylthio)pyridine or tetrahalo-4-(alkylsulfinyl)pyridine in concentrated sulfuric acid followed by the addition thereto of aqueous hydrogen peroxide and reacting the mixture at a temperature between 20°–110° C.

The concentrated sulfuric acid useful in the present invention has an $H_2SO_4$ content of from about 70 to about 85 percent by weight, and preferably from about 78–80 percent by weight of $H_2SO_4$. The use of acid solutions having $H_2SO_4$ contents of less than about 70 percent by weight should be avoided as the solubility of the starting alkylthio or alkyl sulfinyl pyridine in the acid and the oxidative ability of the system decrease rapidly as the water content of the acid solution increases. The reaction therefore proceeds with difficulty and inefficiently in solutions less concentrated than about 78 weight percent $H_2SO_4$.

The hydrogen peroxide useful in the present invention is in the form of an aqueous solution, and preferably contains from about 30 to about 35 percent by weight of $H_2O_2$. Although hydrogen peroxide solutions outside of the preferred range could be used, such solutions do not give the best results. For example, solutions containing less than 30 percent $H_2O_2$ tend to increase the reaction time and increase the volume of materials which must be worked with since the hydrogen peroxide must be present in amount equal to from 2 to 4 moles of $H_2O_2$ per mole of alkylthio pyridine or 1 to 2 moles per mole of alkylsulfinyl pyridine and preferably from 2.2 to 2.4 moles of $H_2O_2$ per mole of alkylthio pyridine or 1.1 to 1.2 moles per mole of alkylsulfinyl pyridine. Concentrations of hydrogen peroxide higher than about 35 percent are less preferred as they are more easily decomposed and more hazardous.

In carrying out this reaction, the tetrahalo-4-(alkylthio) or (alkylsulfinyl)pyridine is first dissolved in the concentrated sulfuric acid. The acid is present in an amount equal to from about 6 to about 20 milliliters per gram of alkylthio or alkylsulfinyl pyridine and preferably from about 13 to about 14 milliliters per gram of the pyridine compound. Thereafter, the aqueous hydrogen peroxide is slowly added thereto. Since hydrogen peroxide tends to decompose quite rapidly at temperatures above 95° C., the peroxide addition and the subsequent reaction are carried out under constant agitation and with adequate temperature control. It is preferred that the temperature be maintained between about 80° and about 90° C.

The reaction is usually substantially complete in from about 1 minute to about 1 hour and contact times of up to about 36 hours have no harmful effect when employing preferred conditions of temperature, acid and hydrogen peroxide concentrations.

Since the tetrahalo-4-(alkylsulfonyl)pyridines are not soluble in sulfuric acid having $H_2SO_4$ concentrations within the 70 to 85 weight percent range employed herein, they tend to crystallize out as they are formed. When the reaction is complete, i.e., crystallization ceases, the reaction mixture is cooled to about room temperature ($\sim$25° C.) and the crystalline product can be recovered by filtration, decantation or other conventional solid-liquid separation technique. The crystalline product is washed with water to remove any remaining acid and dried.

In a further embodiment, the used (spent) sulfuric acid can be recycled after reconstituting the acid solution to a 70 to 85 weight percent $H_2SO_4$ concentration by conventional techniques employing water evaporation. Prior to this step, it is desirable to remove at least a part of any unconverted alkylthio or alkylsulfonyl material by conventional solvent extraction techniques employing inert solvents such as dichloromethane, perchloroethylene, 1,2-dichloroethane and carbon tetrachloride.

DESCRIPTION OF SOME PREFERRED EMBODIMENTS

The following examples illustrate the present invention and the manner by which it can be practiced but, as such, should not be construed as limitations upon the overall scope of the same.

EXAMPLE I

Preparation of 2,3,5,6-tetrachloro-4-(methylsulfonyl) pyridine

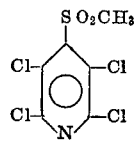

To 200 milliliters of sulfuric acid having a $H_2SO_4$ content of 79.3 weight percent was added 15 grams (0.057 mole) of 2,3,5,6-tetrachloro-4-(methylthio)pyridine and the resulting solution was warmed to 65° C. To this solution was added, under constant agitation, 15 milliliters of 30 percent hydrogen peroxide (0.145 mole $H_2O_2$). The temperature was allowed to rise to 95° C. and copious crystallization occurred. The mixture was cooled to 25° C. and the reaction mixture filtered employing a sintered glass funnel with suction. The crystals were washed with water until free of acid and dried at 60° C. for 1 hour. The 2,3,5,6-tetrachloro-4-(methylsulfonyl)pyridine product which melts at 138°–140° C. was obtained in a yield of 13 grams and had a purity of 98.6 percent as determined by vapor phase chromatography, thin-layer chromatography and infrared spectrum analysis. In addition $\sim$2 grams of product comprising 92.3 percent of the 2,3,5,6-tetrachloro-4-(methylsulfonyl)pyridine was obtained by diluting the acid phase with water and filtering. The total sulfinyl impurities constituted 1.4 weight percent of the initial 13 grams of product and 1.8 weight percent of the $\sim$2 grams from the acid dilution step.

EXAMPLE II

An additional run is carried out as above in Example I employing recovered sulfuric acid which is reconcentrated to 80 weight percent $H_2SO_4$. The 2,3,5,6-tetrachloro-4-(methylsulfonyl)pyridine product is recovered in a yield of 13 grams and has a purity of 98 percent.

EXAMPLE II

Preparation of 2,3,5,6-tetrachloro-4-(methylsulfonyl) pyridine

To 100 milliliters of sulfuric acid having a $H_2SO_4$ content of 79.3 weight percent was added 15 grams (0.057 mole) of 2,3,5,6-tetrachloro-4-(methylthio)pyridine and the resulting solution was warmed to 65° C. To this solution was added, under constant agitation, 20 milliliters of 30 percent hydrogen peroxide (0.194 mole $H_2O_2$). The temperature was allowed to rise to 95° C. and copious crystallization occurred. The mixture was cooled to 25° C. and the reaction mixture filtered employing a sintered glass funnel with suction. The crystals were washed with water until free of acid and dried at 60° C. for 1 hour. The 2,3,5,6-tetrachloro-4-(methylsulfonyl)pyridine product was obtained in a yield of 15 grams and had a purity of 92.5 percent.

EXAMPLE IV

Preparation of 2,3,5,6-tetrachloro-4-(methylsulfonyl) pyridine

To 100 milliliters of sulfuric acid having a $H_2SO_4$ content of 79.3 weight percent was added 15 grams (0.057 mole) of 2,3,5,6-tetrachloro-4-(methylthio)pyridine and the resulting solution was warmed to 65° C. To this solution was added, under constant agitation, 12 milliliters of 30 percent hydrogen peroxide (0.116 mole $H_2O_2$). The temperature was allowed to rise to 95° C. and copious crystallization occurred. The mixture was cooled to 25° C. and the reaction mixture filtered. The crystals were washed with water until free of acid and dried at 60° C. for 1 hour. The 2,3,5,6-tetrachloro-4-(methylsulfonyl)pyridine product was obtained in a yield of 15 grams and had a purity of 91 percent.

In similar operations, the same kind of results are obtained when carrying out the process for the preparation of the following compounds.

2,3,5,6 - Tetrachloro-4-(ethylsulfonyl)pyridine melting at 128°–131° C. prepared by oxidizing 2,3,5,6-tetrachloro-4-(ethylthio)pyridine;

2,3,5,6-tetrachloro - 4 - (methylsulfonyl)pyridine prepared by oxidizing 2,3,5,6-tetrachloro-4-(methylsulfinyl) pyridine;

2,3,5,6-tetrachloro-4-(propylsulfonyl)pyridine melting at 163–172° C. prepared by oxidizing 2,3,5,6-tetrachloro-4-(propylthio)pyridine;

2,3,5,6-tetrachloro - 4 - (n-butylsulfonyl)pyridine prepared by oxidizing 2,3,5,6-tetrachloro-4-(n-butylthio)-pyridine;

2,6-difluoro-3,5-dichloro - 4 - (propylsulfonyl)pyridine prepared by oxidizing 2,6-difluoro-3,5-dichloro-4-(propylsulfonyl)pyridine;

2,6-difluoro-3,5-dichloro - 4 - (methylsulfonyl)pyridine melting at 118°–123° C. prepared by oxidizing 2,6-difluoro-3,5-dichloro-4-(methylthio)pyridine;

2,6-dibromo-3,5-dichloro - 4 - (methylsulfonyl)pyridine prepared by oxidizing 2,6-dibromo-3,5-dichloro-4-(methylsulfinyl)pyridine;

2,3,5,6-tetrachloro - 4 - (pentylsulfonyl)pyridine melting at 92° C. prepared by oxidizing 2,3,5,6-tetrachloro-4-(pentylthio)pyridine;

2,3,5,6 - tetrachloro-4-(isobutylsulfonyl)pyridine melting at 119° C. prepared by oxidizing 2,3,5,6-tetrachloro-4-(isobutylthio)pyridine;

2,3,5,6-tetrachloro-4-(hexylsulfonyl)pyridine prepared by oxidizing 2,3,5,6-tetrachloro-4-(hexylsulfinyl)pyridine;

2,6-dibromo - 3,5 - dichloro-4-(t-butylsulfonyl)pyridine prepared by oxidizing 2,6 - dibromo - 3,5 - dichloro-4-(t-butylthio)pyridine; and 2,6-difluoro - 3,5 - dichloro-4-(2'-ethylbutylsulfonyl)pyridine prepared by oxidizing 2,6-difluoro-3,5-dichloro-4-(2'-ethylbutylthio)pyridine.

What is claimed is:

1. A method for preparing tetrahalo-4-(alkylsulfonyl)pyridines corresponding to the formula

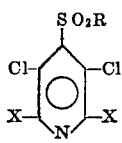

wherein R represents alkyl of 1 to 6 carbon atoms and X represents chlorine, bromine or fluorine which comprises dissolving the corresponding tetrahalo-4-(alkylthio) or (alkylsulfinyl)pyridine compound in concentrated sulfuric acid having a $H_2SO_4$ content of from about 70 to about 85 percent by weight and thereafter contacting this mixture with about 30% aqueous hydrogen peroxide at a temperature of from about 20° to 110° C. for a period of time of from about 1 minute to about 36 hours.

2. The method of Claim 1 wherein the contacting is carried out under constant agitation.

References Cited

UNITED STATES PATENTS

| | | | |
|---|---|---|---|
| 3,296,272 | 1/1967 | Johnston | 260—294.8 G |
| 3,415,832 | 12/1968 | Carwford | 260—294.8 F |
| 3,719,682 | 3/1973 | Domenico | 260—294.8 F |
| 3,732,234 | 5/1973 | Domenico | 260—294.8 F |

OTHER REFERENCES

Gilman: Organic Chemistry, vol. IV, p. 1124 (1953), J. Wiley & Sons Pub.

ALAN L. ROTMAN, Primary Examiner

U.S. Cl. X.R.

260—294.8 G. 424—263